US008291053B2

(12) United States Patent
Kim et al.

(10) Patent No.: US 8,291,053 B2
(45) Date of Patent: Oct. 16, 2012

(54) METHOD AND APPARATUS FOR MANAGEMENT AND TRANSMISSION OF CLASSIFIED CONDITIONAL ACCESS APPLICATION TO PROVIDE DOWNLOADABLE CONDITIONAL ACCESS SYSTEM SERVICE

(75) Inventors: Heejeong Kim, Daejeon (KR); Eun Jung Kwon, Daejeon (KR); Soon Choul Kim, Daejeon (KR); O Hyung Kwon, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 432 days.

(21) Appl. No.: 12/330,896

(22) Filed: Dec. 9, 2008

(65) Prior Publication Data
US 2009/0150552 A1 Jun. 11, 2009

(30) Foreign Application Priority Data

Dec. 11, 2007 (KR) .......................... 10-2007-0127979

(51) Int. Cl.
G06F 15/177 (2006.01)

(52) U.S. Cl. .............. 709/222; 725/25; 725/31; 725/91; 713/155

(58) Field of Classification Search .................. 709/222; 725/25, 31, 91; 713/155
See application file for complete search history.

(56) References Cited

U.S. PATENT DOCUMENTS

| 6,246,767 | B1 | 6/2001 | Akins, III et al. |
| 2006/0117304 | A1* | 6/2006 | Anastassopoulos et al. . 717/136 |
| 2008/0098212 | A1* | 4/2008 | Helms et al. ................... 713/155 |
| 2008/0177998 | A1* | 7/2008 | Apsangi et al. ............... 713/155 |
| 2009/0201881 | A1* | 8/2009 | Chun et al. ..................... 370/331 |

FOREIGN PATENT DOCUMENTS

| KR | 1020060118261 A | 11/2006 |
| KR | 10-0729083 B1 | 6/2007 |

OTHER PUBLICATIONS

Berners-Lee et al; "Uniform Resource Identifiers (URI): Generic Syntax"; Aug. 1998; IETF Network Working Group; RFC 2396; pp. 1-41.*
Hong, Inhwa, et al; "Development Trends in Security Technology for Next Generation Broadcasting Communication Convergence Service", Published in pp. 48-56, vol. 11-2, the Journal of the Korean Society of Broadcast Engineers/Published on Jun. 2006.

* cited by examiner

Primary Examiner — Jeffrey Nickerson
(74) Attorney, Agent, or Firm — Ladas & Parry LLP

(57) ABSTRACT

A method and apparatus for management and transmission of a classified conditional access application to provide Downloadable Conditional Access System (DCAS) service according to disclosed embodiments is an effective managing method according to a type of a conditional access module in a software version in the DCAS. In particular, it relates to a method and apparatus which can continuously provide Pay per View (PPV) service during movement in a DCAS service operator (SO) network, such as maintaining independence of CAS SO in DCAS, provide adaptability to adapt to a variety of policies of the SO, and install an optimum application in a terminal.

12 Claims, 4 Drawing Sheets

METHOD AND APPARATUS FOR MANAGEMENT AND TRANSMISSION OF CLASSIFIED CONDITIONAL ACCESS APPLICATION TO PROVIDE DOWNLOADABLE CONDITIONAL ACCESS SYSTEM SERVICE

CROSS-REFERENCE TO RELATED APPLICATION

This application claims priority from Korean Patent Application No. 10-2007-0127979, filed on Dec. 11, 2007, in the Korean Intellectual Property Office, the entire disclosure of which is incorporated herein by reference.

BACKGROUND OF THE INVENTION

1. Field of the Invention

The present invention relates to a method and apparatus for providing Downloadable Conditional Access System (DCAS) service and managing the same. In particular the present invention relates to a method and apparatus for management and transmission of a classified conditional access application to provide DCAS service.

This work was supported by the IT R&D program of MIC/IITA [2007-S-007-01, The Development of Downloadable Conditional Access System].

2. Description of Related Art

A Conditional Access System (CAS) is a system that assigns authority to watch fee-based broadcast to only authenticated subscribers. A terminal of the CAS has functions of managing a conditional access key and decoding accessed signal encoded by the conditional access key so as to watch the accessed signal, and the function is referred to as a conditional access module. In a conventional CAS applied to a digital cable broadcast, a conditional access module has been implemented in a cable card form. However, as problems of high cost and inefficient management ability of the cable card is raised, a Downloadable Conditional Access System (DCAS) is suggested. The DCAS safely downloads the conditional access application, namely, conditional access module implemented in software form to an authenticated subscriber terminal, thereby supporting a conditional access service to subscribers and assigning authority to remotely configure or reset a conditional access method to a service operator.

Accordingly, the conditional access module of the conventional CAS that is provided off-line is required to be stored in the DCAS, and also an effective method that can safely download a stored conditional access module to an authenticated terminal is required. That is, an effective storage and transmission method according to a feature of a conditional access application.

Also, the conventional CAS operates in an integrated environment system where a series of functions required to perform the CAS are closely combined with a CAS service operator, such as setting up conditional access module for a terminal, registering a subscriber, paying for fee-based broadcast, and assigning authorization to view a fee-based broadcast.

However, the DCAS manages a conditional access module received from a CAS service provider and downloads the conditional access module to an authenticated terminal, and registers the terminal as a subscriber. Then, the CAS provider performs a subscribing and payment process for the fee-based broadcast, and assigns authorization to view a fee-based broadcast. In this case, the CAS service operator is required to minimize an interface with the DCAS to have security and autonomy.

SUMMARY OF THE INVENTION

An aspect of the present invention provides a method which can improve a problem of a conventional art. A Downloadable Conditional Access System (DCAS) manages a conditional access module received from a CAS service provider. In this case, the CAS service provider is required to minimize an interface with the DCAS to have security and autonomy.

Another aspect of the present invention also provides an effective application management method which can store a conditional access application and transmit the same to a plurality of terminals so as to provide adaptability to adapt to a variety of policies of an operator. Because the conditional access application which is a conditional access module based on software should be suitable for a variety of operation environments such as software- or hardware-based terminals, and the like. At the same time, the conditional access application should have an ability to adapt to different conditional access key for charged service depending on a terminal.

According to an aspect of the present invention, there is provided a method of controlling DCAS Provisioning System (DPS) including: accessing conditional access application and information for conditional access service; storing the accessed conditional access application in an Integrated Personalization Server (IPS); and providing an Authentication Proxy (AP) with IPS connection information (IPS_Connect_Info) and the conditional access application information to be transmitted to a terminal.

According to an aspect of the present invention, there is provided a method of controlling an AP including: performing mutual authentication with respect to a terminal; obtaining information for an identifier and configuration environment of the authenticated terminal; and providing the authenticated terminal with IPS_Connect_Info and setup information to download a conditional access application.

According to an aspect of the present invention, there is provided a method of controlling a terminal of DCAS including: performing a series of authentication processes with an AP; being provided with IPS_Connect_Info and setup information according to the authentication; and downloading application from an IPS according to the provided information to implement the application.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
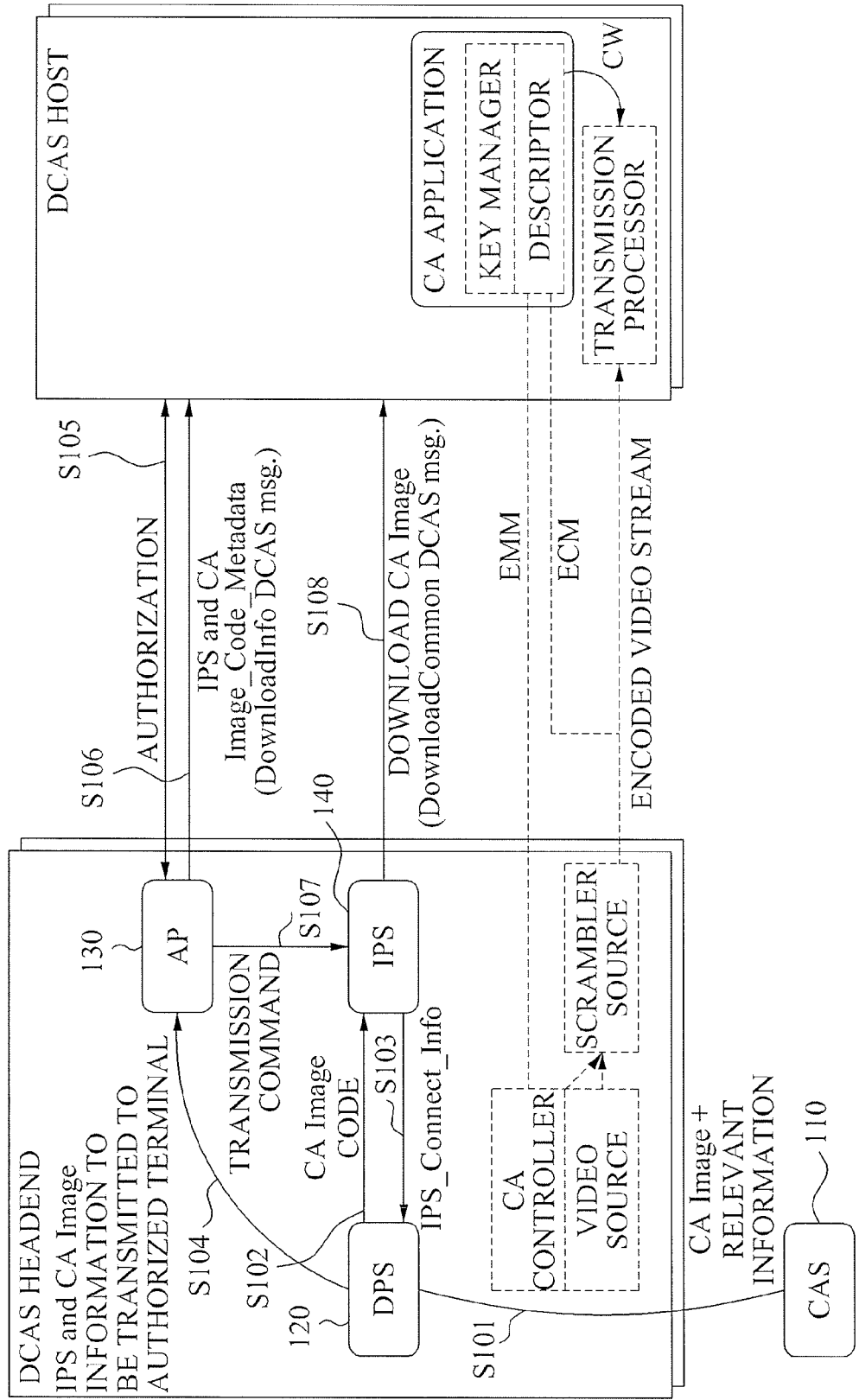
FIG. 1 illustrates a configuration of a Downloadable Conditional Access System (DCAS) and downloading process of a conditional access application according to an example embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

When detailed descriptions related to a well-known related function or configuration are determined to make the spirits of the present invention ambiguous, the detailed descriptions will be omitted herein. Also, terms used throughout the present specification are used to appropriately describe exemplary embodiments of the present invention, and thus may be different depending upon a user and an operator's intention, or practices of application fields of the present invention. Therefore, the terms must be defined based on descriptions made through the present invention.

FIG. 1 illustrates a configuration of DCAS and downloading process of a conditional access application according to an example embodiment of the present invention.

The DCAS and downloading process of the conditional access application according to an example embodiment of the present invention is described below referring to FIG. 1.

As shown in FIG. 1, the DCAS system includes a CAS service 110, a DPS 120 that plays role of a manager, an AP 130 that plays a role of a window of a server and an authentication server with respect to a terminal, and an IPS 140 that plays a role of a transmitting server of the CAS. An example embodiment with respect to the above is as follows.

The CAS server 110 provides the DPS 120 with a conditional access application and relevant information in operation S101, then the DPS 120 that receives the conditional access application and relevant information stores the accessed conditional access application in an IPS 140 in operation S102, and provides the AP 130 with either IPS_Connect_Info or the conditional access application to be transmitted to a terminal.

After that, the AP 130 goes through a series of authentication process with respect to the terminal in operation S104, and provides the terminal with IPS_Connect_Info and setup information to download a conditional access application in operation S105.

According to the providing of the IPS_Connect_Info and setup information, the terminal downloads the conditional access application from the IPS 140 and sets up and implements the conditional access application according to indication previously provided by the AP 130, thereby starting the conditional access service in operation S106.

In this case, in operation S101, the CAS server 110 provides the DPS 120 of the DCAS with an image file of a Conditional Access Application (CA Image file) that is required to be set up in a terminal to provide conditional access service. In this case, the CAS server 110 also provides image file type information, setup information, and an operation environment of the subject terminal together with unique information for a terminal that subscribes and pays for a fee-based broadcast. Information that server 110 provides to the DPS 120 is as shown in <Table 1>.

TABLE 1

| Field_Name | Description |
| --- | --- |
| CA Image_Id | CA Image Identifier |
| CA Image_Type | Default\|Common\|Individual |
| Target_Host_Conf | s/w version and h/w version of a terminal |
| Target_Host_Id | Identifier of a subscriber terminal of fee-based broadcast, being effective when a CA Image_Type is individual. |
| CA Image_Code_Metadata | version, size, directory configuration, setup information, and Bound_Sub_CA Image_Id of CA Image Code |
| CA Image_Code | Binary image code |

Figure 2:
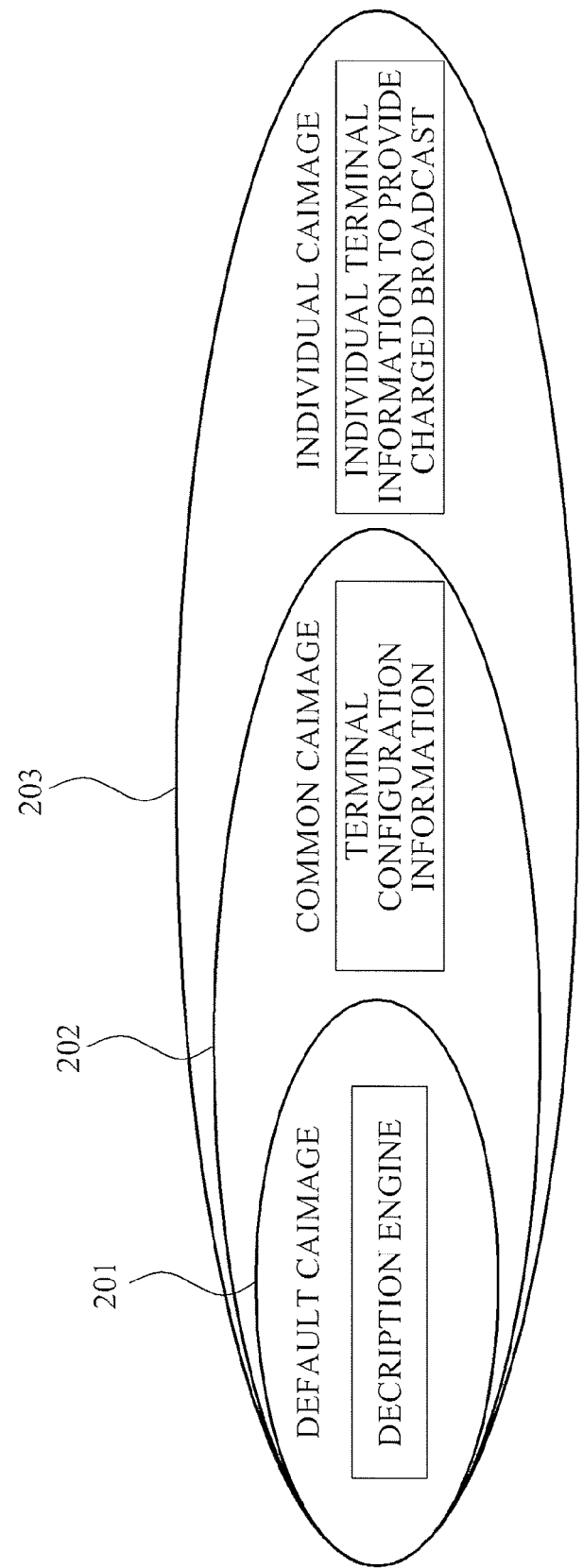
FIG. 2 illustrates classified types of conditional access applications according to an example embodiment of the present invention.

FIG. 2 illustrates classified types of conditional access applications according to an example embodiment of the present invention.

The conditional access application according to an example embodiment of the present invention is described below referring to FIG. 2.

As shown in FIG. 2, the conditional access application is classified as Default Conditional Access Application Image (Default CA Image) 201, Common Conditional Access Application Image (Common CA Image) 202, and Individual Conditional Access Application Image (Individual CA Image) 203 according to unique information based on a level of a terminal.

The Default CA Image 201 may universally be installed in each terminal including a terminal with the lowest capability and may generally include a description engine. The Common CA Image 202 is separately installed according to configuration information of a terminal, such as software-based or hardware-based.

A CAS 110 generates the Common CA Image 202 every time a possible terminal configuration is generated, and transmits the Common CA Image 202 to a DPS 120. Terminal configuration information of the Default CA Image 201 is the same as that of the Common CA Image 202 which has the lowest capability. The Default CA Image 201 and the Common CA Image 202 represent access qualification of a terminal authenticated by a Service Operator (SO).

The Individual CA Image 203 may include unique conditional access key information for a terminal that pays for charged conditional access broadcast to watch the same.

Upon completion of subscribing and paying for the fee-based broadcast, the CAS server 110 generates the Individual CA Image 203 and transmits the same to the DPS 120.

A type of the conditional access application may be implemented as a binary patch type or a separate CA Image type that provides service by performing a one-time download. That is, the Common CA Image 202 may be implemented as a patch type with respect to the Default CA Image 201 and an Individual CA Image 203 may be implemented as a patch type with respect to the Common CA Image 202. In this case, a subordinate image patched in a Bound_Sub_CA Image_Id of CA Image_Code_Metadata is required to be marked.

The CAS server 110 may provide either all of the three types of conditional access applications or a portion of the three types of the conditional access applications. For example, when the CAS server 110 is reluctant to distributed conditional access key information through the DCAS, the CAS server 110 may merely provide the Default CA Image 201 or the Common CA Image 202.

Whether the conditional access application is implemented as a binary patch or which type of conditional access applications is supported is flexibly determined depending on policy of a CAS SO and the DCAS.

The DPS 120 stores a conditional access image file in the IPS 140 in operation S102. In this case, a storage mechanism (1 copy, n copy) and delivery mechanism (broadcast/multicast/unicast, DSM-CC/TFTP/HTTP) that is suitable for a type of the conditional access image file are selected according to policy of the DCAS, and also stored in the corresponding IPS 140 by designating the same storage mechanism and delivery mechanism. For example, the Default CA Image 201 may be multicasted or unicasted to every terminal and the unicast method may be selected for the Individual CA Image 203.

In operation S103, the IPS 140 provides the DPS 120 with IPS_Connect_Info which includes location information where the conditional access application is actually stored.

The DPS 120 manages the IPS_Connect_Info and an indicator (IPS_Id) of the IPS 140 where each conditional access image file is stored. Also, the DPS 120 manages a list of charged subscribers where the Individual CA Image 203 is set up.

In operation S104, the DPS 120 provides the AP 130 with the IPS_Connect_Info to be transmitted to the authenticated terminal, information (CA Image_Code_Metadata) that is required to set up the conditional access image file and the indicator (Assigned_IPS_Id) of the IPS 140 where the conditional access application image file is stored. Also the DPS 120 provides charged subscriber terminal information which the AP 130 is in charge of.

In operation S105, the AP 130 goes through an authentication process with respect to the terminal and obtains information for an identifier and configuration environment of the authenticated terminal.

Information that the DPS 120 provides to the AP 130 is as shown in Table 2.

Figure 3:
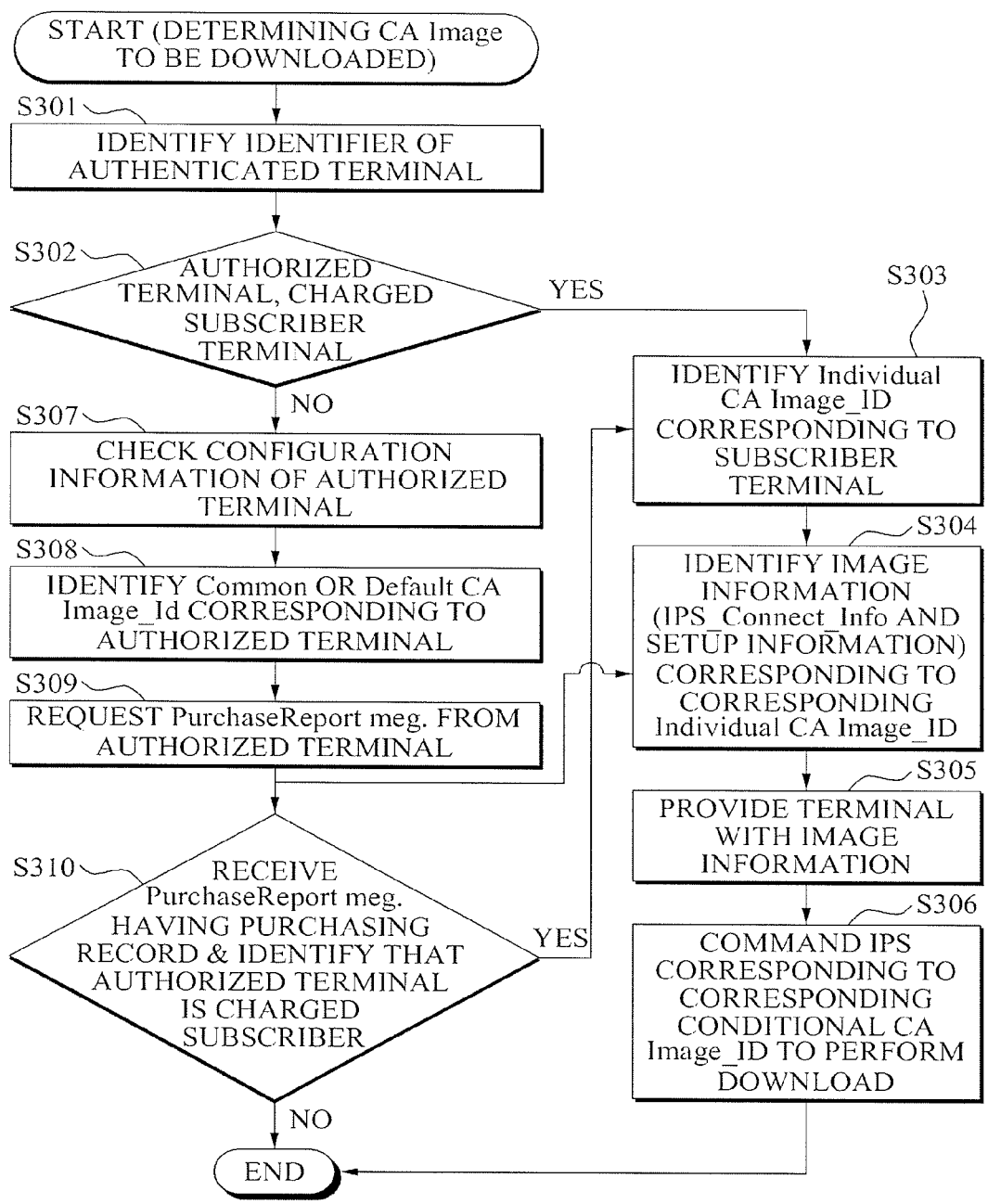
FIG. 3 is a flowchart illustrating an identifying process of a conditional access image file to be transmitted from an Authentication Proxy (AP) to an authenticated terminal according to an example embodiment of the present invention.

FIG. 3 is a flowchart illustrating an identifying process of a conditional access image file to be transmitted from an AP to an authenticated terminal according to an example embodiment of the present invention.

The AP 130 identifies the authenticated terminal identifier in operation S301, and then verifies whether the terminal is a charged subscriber in operation S302.

When the terminal is included in a charged subscriber list as a result of the verification, an Individual CA Image having CA Image_ID corresponding to the subscriber terminal is identified and its relevant information is transmitted to the terminal. That is, when the terminal is a charged subscriber, an individual image identifier corresponding to the terminal and image information corresponding to the corresponding image identifier (IPS_Connect_Info and setup information) are identified in operation S303 and S304, and the image information is provided to the terminal in operation S305. Also, an IPS corresponding to the corresponding image identifier is commanded to perform a download in operation S306, thereby completing the process.

However, when the authenticated terminal is not a subscriber, configuration information of the authenticated terminal is checked in operation S307, and a common or default image identifier corresponding to the terminal is identified in operation S308. In this case, when the terminal has the lowest capability, a Default CA Image 201 is selected, and when the terminal is different from the lowest specifications, a Common CA Image 202 corresponding to the configuration of the terminal is selected and its relevant information is transmitted to the terminal.

After identification of the identifier, a purchasing report message from the terminal is requested in operation S309. When the purchasing report message having a purchasing

TABLE 2

| | | Field_Name | Description |
|---|---|---|---|
| CA Image List | CA Image_Table₁ | CA Image_Id | CA Image Identifier |
| | | Target_Host_Conf | s/w version and h/w version of a terminal |
| | | Assigned_IPS_Id | Delivery_mechanism (DSM-CC\|TFTP\|HTTP\|...) IPS_Connect_Info (URI = server address + location of folder + file name) |
| | | CA Image_Code_Methadata | version, size, directory configuration, setup information, and Bound_Sub_CA Image_Id of CA Image Code |
| | CA Image_Table_n | ... | ... |
| Charged Subscriber List | Subscriber_Info₁ | CA Image Target_Host_Id | CA Image Identifier Subscriber terminal Identifier |
| | Subscriber_Info_n | ... | |

Also, in operation S106, the AP 130 transmits DownloadInfo DCAS message to the authenticated terminal, the DownloadInfo DCAS message includes the IPS_Connect_Info and the image file set up information (CA Image_Code_Methdata) to download the conditional access image. In this case, a process illustrated in FIG. 3 is performed to determine a conditional access image that is suitable for the authenticated terminal.

record is received and the terminal is identified as a subscriber terminal from a DPS, in operation S310 it is determined whether the terminal is a subscriber that has been subscribing and paying for a previous network and thus, operations S303 through S306 is processed, otherwise, the process is ended.

Figure 4:
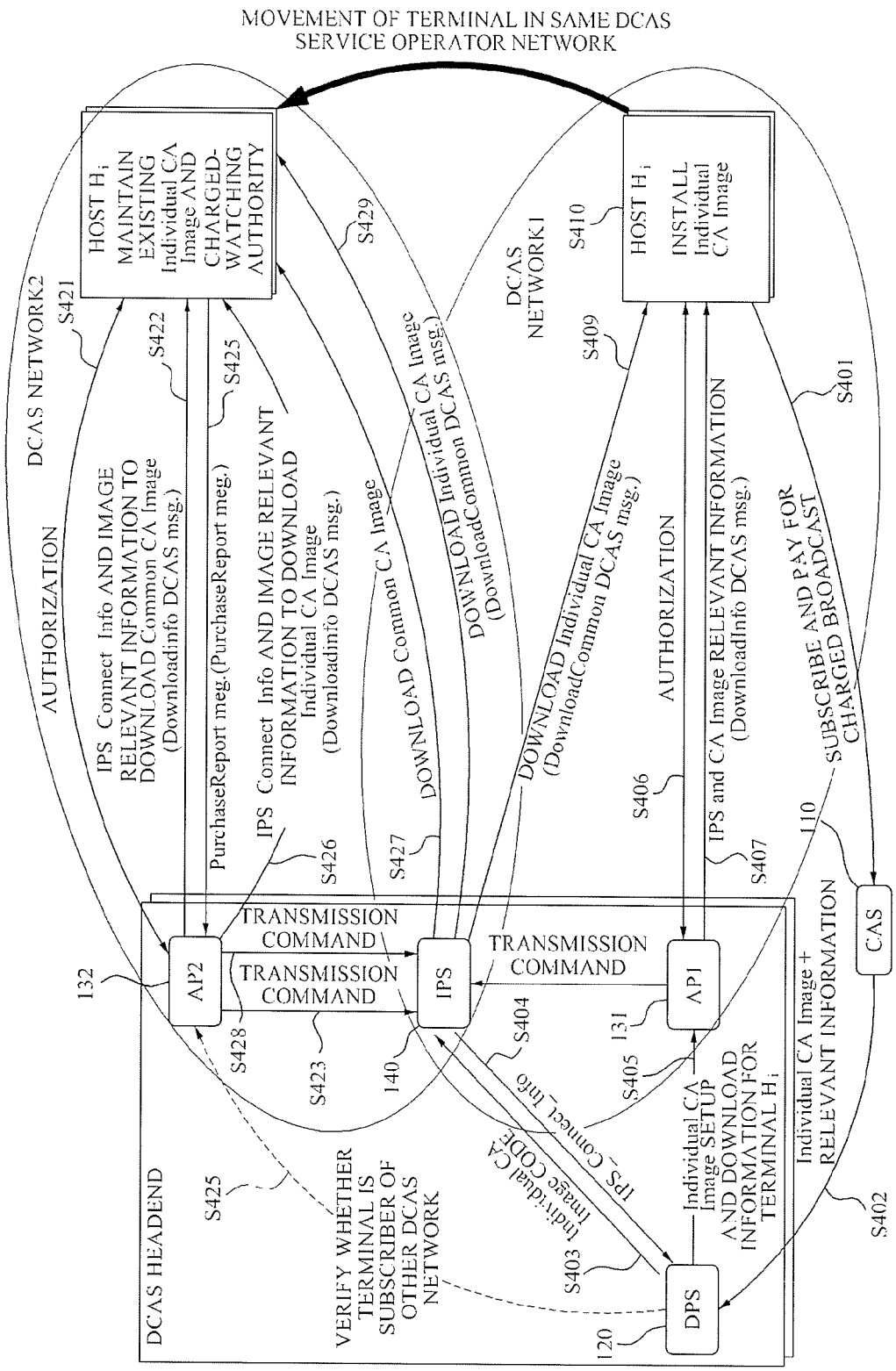
FIG. 4 illustrates a downloading process of a conditional access application to verify a network movement charged subscriber and to support a Pay per View (PPV) service according to an example embodiment of the present invention.

FIG. 4 illustrates downloading process of a conditional access application to verify a network movement charged subscriber and to support a Pay per View (PPV) service according to an example embodiment of the present invention.

The downloading process of the conditional access application to verify the network movement charged subscriber and to support the PPV service according to an example embodiment of the present invention is described below referring to FIG. 4.

As shown in FIG. 4, the present invention may support to maintain fee-based broadcasting viewing authority even when a terminal moves between AP networks of the same DCAS service operator. When the terminal that has been connected to an AP1 131 and receiving fee-based broadcast tries to connect to an AP2 132 and to receive authentication, although the terminal is a subscriber, information of the terminal may be missing in charged subscriber information of the currently connected AP2 132. To overcome the limit, the AP2 132 verifies whether purchasing record exists and also verifies, from a DPS 120, whether a terminal which reports that there is a purchasing record is included in a complete charged subscriber list of the DCAS, even when it is determined that a common or default type of a conditional access image is stored in the terminal. When the terminal is verified as a charged subscriber terminal of another AP, charged subscriber information of the terminal is renewed and the terminal is managed so that the terminal can maintain charged-viewing with the existing charged subscriber information. As described above, when the terminal is a fee-based broadcasting subscriber, the present invention supports to use the same CAS even after the terminal's movement within the network.

To perform the above-mentioned process, after the terminal completes subscribing and paying for the fee-based broadcast in operation S401, a CAS server 110 provides the DPS 120 with Individual CA Image and relevant information in operation S402.

After the providing of the DPS 120 with Individual CA Image and the relevant information, the DPS 120 provides an IPS 140 with the Individual CA Image in operation S403, receives IPS_Connect_Info in operation S404, and provides the AP1 113 with setup and download information of the Individual CA Image for the terminal that completes paying in operation S405.

In operation S406, the AP1 131 that receives the information performs mutual authentication with respect to the subscriber terminal of an existing network that completes paying. After mutual authentication, the IPS 140 and CA Image relevant information (Download Info DCAS message) is provided to the terminal in operation S407, at the same time, the IPS 140 is commanded to transmit image in operation S408. Thereafter, the Individual CA Image may be downloaded from the IPS 140 in operation 409, and the Individual CA Image is installed in the terminal in operation S410.

According to the above-mentioned process, when a terminal that has been using a variety of service of DCAS Network 1 moves to a DCAS network 2 of the same DCAS service operator, mutual authentication between the terminal and a new AP2 is performed in operation S421 as in operation S406. After the authentication, the AP2 provides the new terminal in the new network with the IPS 140 and CA Image relevant information (DownloadInfo DCAS message) to download a Common CA Image in operation S422. After the AP2 transmits a transmission command to the IPS 140, the Common CA Image (DownloadCommon DCAS meg.) is downloaded from the IPS 140 in operation S424. Then, a purchasing report message is provided to verify whether the terminal is a subscriber of an existing network in operation S425. According to the purchasing report message, whether the terminal is a charged subscriber that moves from another DCAS Network in operation S426 is verified, and the IPS 140 and CA Image relevant information is provided to download an Individual CA Image in operation S427. The AP2 command the IPS 140 to transmit a new Individual CA Image in operation S258, the terminal performs a download of a suitable Individual CA Image for the DCAS Network 2 in operation S259. Through the above operations S421 to S429, the existing terminal subscriber that moves to a new network can maintain Individual CA Image and fee-based broadcasting viewing authority. Also, continuous service is provided to the existing terminal subscriber. Where change of an Individual CA Image code caused by DCAS Network movement is not required, operations S428 through S429 may be omitted.

The method for management and transmission of a classified conditional access application to provide DCAS service according to example embodiments may be recorded in computer-readable media including program instructions to implement various operations embodied by a computer. The media may also include, alone or in combination with the program instructions, data files, data structures, and the like. The media and program instructions may be those specially designed and constructed for the purposes of example embodiments, or they may be of the kind well-known and available to those having skill in the computer software arts. Examples of computer-readable media include magnetic media such as hard disks, floppy disks, and magnetic tape: optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of example embodiments.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of controlling Downloadable Conditional Access System (DCAS) Provisioning System (DPS) comprising:
   receiving, by the DPS, a conditional access application that is required to be set up in a terminal to provide conditional access service and information for a conditional access service,
   wherein the conditional access application is classified into a default type, a common type and an individual type;
   storing, by the DPS, the conditional access application in an Integrated Personalization Server (IPS);
   receiving, by the DPS, IPS connection information (IPS_Connect_Info) which includes location information where the conditional access application is actually stored in the IPS;
   managing, by the DPS, the IPS_Connect_Info and an indicator of the IPS where each conditional access image file classified into the default type, the common type and the individual type is stored;
   providing, by the DPS, to an Authentication Proxy (AP) associated with a DCAS Network the IPS_Connect- _Info, the conditional access application information, and the indicator where the conditional access application is stored;

wherein the terminal receives and installs the conditional access application from the IPS;

when a terminal moves from the DCAS Network to an another DCAS Network, providing, by the DPS, to an AP associated with the another DCAS Network an indication of whether the terminal is a charged subscriber of the DCAS network; and wherein in response to the AP associated with the another DCAS Network receiving the indication, omitting a transmitting of a new conditional access application to the terminal.

2. The method of claim 1, wherein the conditional access application is classified into the default type that is universally installed in each terminal, the common type including setup information according to unique operation environment of a terminal, and the individual type including a fee-based broadcasting conditional access key, and provides at least one of the types.

3. The method of claim 1, wherein the conditional access application information includes classified type information of the conditional access application, image file setup information, an operation environment of a subject terminal, or unique information of a charged subscriber terminal.

4. The method of claim 1, wherein the conditional access application for the conditional access service is either a binary patch type or a separate Conditional Access Application Image (CA Image) type that provides a service by performing a one-time download.

5. The method of claim 1, wherein the storing of the accessed conditional access application in the IPS comprises:
selecting a suitable storage mechanism and delivery mechanism according to a type of an image file of the accessed conditional access application; and
designating a corresponding IPS according to the selection and storing the accessed conditional access application.

6. The method of claim 1, wherein:
the IPS_Connect_Info includes at least one of a delivery mechanism, an address, and a file name required for obtaining an image file of a terminal, and
the conditional access application information includes, terminal configuration information required for setup and operation of a conditional access application image file, image file version, and charged subscriber terminal information, and
wherein the charged subscriber terminal information further comprises that the terminal is an authenticated subscriber, which is currently being charged to watch a fee-based cable broadcast.

7. A Downloadable Conditional Access System (DCAS) Provisioning System (DPS) comprising:
a memory; and
a processor configured to:
receive a conditional access application that is required to be set up in a terminal to provide conditional access service and information for a conditional access service, wherein the conditional access application is classified into a default type, a common type and an individual type;
store the conditional access application in an Integrated Personalization Server (IPS);
receive IPS connection information (IPS_Connect_Info) which includes location information where the conditional access application is actually stored in the IPS;
manage the IPS_Connect_Info and an indicator of the IPS where each conditional access image file is stored;
provide to an Authentication Proxy (AP) associated with a DCAS Network the IPS_Connect_Info, the conditional access application information, and the indicator where the conditional access application is stored,
wherein the terminal receives and installs the conditional access application from the IPS;
when a terminal moves from the DCAS Network to an another DCAS Network, the processor is further configured to provide to an AP associated with the another DCAS Network an indication of whether the terminal is a charged subscriber of the DCAS network; and
wherein in response to the AP associated with the another DCAS Network receiving the indication, omitting a transmitting of a new conditional access application to the terminal.

8. The system of claim 7, wherein the conditional access application is classified into the default type that is universally installed in each terminal, the common type including setup information according to unique operation environment of a terminal, and the individual type including a fee-based broadcasting conditional access key, and provides at least one of the types.

9. The system of claim 7, wherein the conditional access application information includes classified type information of the conditional access application, image file setup information, an operation environment of a subject terminal, or unique information of a charged subscriber terminal.

10. The system of claim 7, wherein the conditional access application for the conditional access service is either a binary patch type or a separate Conditional Access Application Image (CA Image) type that provides a service by performing a one-time download.

11. The system of claim 7, wherein the processor is further configured to:
select a suitable storage mechanism and delivery mechanism according to a type of an image file of the accessed conditional access application; and
designate a corresponding IPS according to the selection and storing the accessed conditional access application.

12. The system of claim 7, wherein
the IPS_Connect_Info includes at least one of a delivery mechanism, an address, and a file name required for obtaining an image file of a terminal, and
the conditional access application information includes, terminal configuration information required for setup and operation of a conditional access application image file, image file version, and charged subscriber terminal information.

* * * * *